US012776421B1

(12) United States Patent
Wong et al.

(10) Patent No.: US 12,776,421 B1
(45) Date of Patent: Oct. 27, 2026

(54) SHAPED FUSION TARGET DEVICE AND RELATED PROCESS

(71) Applicant: Blue Laser Fusion, Inc., Palo Alto, CA (US)

(72) Inventors: Matthew Wong, Palo Alto, CA (US); Alex Moreland, Palo Alto, CA (US); Shuji Nakamura, Palo Alto, CA (US)

(73) Assignee: Blue Laser Fusion, Inc., Palo Alto, CA (US)

( * ) Notice: Subject to any disclaimer, the term of this patent is extended or adjusted under 35 U.S.C. 154(b) by 299 days.

(21) Appl. No.: 18/431,782

(22) Filed: Feb. 2, 2024

(51) Int. Cl.
*G21B 1/19* (2006.01)

(52) U.S. Cl.
CPC .................................... *G21B 1/19* (2013.01)

(58) Field of Classification Search
CPC .............................. G21B 1/19; B05D 2259/00
See application file for complete search history.

(56) References Cited

U.S. PATENT DOCUMENTS 4,323,420 A * 4/1982 Masnari .................. G21B 1/19
216/33
4,381,963 A * 5/1983 Goldstein ................ G21B 1/19
264/225
5,168,400 A 12/1992 Moses
5,487,094 A * 1/1996 Sudo ........................ G21B 1/19
376/151
8,208,508 B2 6/2012 Deri et al.
9,171,646 B2 10/2015 Moses et al.
10,410,752 B2 9/2019 Hora
10,476,226 B2 11/2019 Bayramian et al.
10,660,192 B2 5/2020 Campbell et al.
11,387,007 B2 7/2022 Moses et al.
2003/0002610 A1 1/2003 Panarella
2008/0256850 A1* 10/2008 Kley ...................... B82Y 35/00
427/551

(Continued)

FOREIGN PATENT DOCUMENTS

WO 2011029031 A1 3/2011
WO 2012064767 A1 5/2012

(Continued)

OTHER PUBLICATIONS

Peter Russbueldt et al., "Innoslab Amplifiers", IEEE Journal of Selected Topics in Quantum Electronics, Jan./Feb. 2015, vol. 21, No. 1, pp. 447-463, doi: 10.1109/JSTQE.2014.2333234.

(Continued)

*Primary Examiner* — Sharon M Davis
(74) *Attorney, Agent, or Firm* — Ogawa P.C.

(57) ABSTRACT

A method of fabricating a nuclear fusion target device includes providing a mechanical mold device having a recessed region configured as a shape for the nuclear fusion target device. An interior of the recessed region is coated with a coating material to form an exterior shell. While the shell is within the recessed region, a plurality of fuel target layers are successively deposited on an inner surface of the exterior shell. The plurality of fuel target layers includes an outermost fuel target layer comprising a first fuel material comprising pB11 and at least two inner target layers comprising additional fuel materials. The shell containing the plurality of fuel target layers is then released from the recessed region of the mechanical mold device.

25 Claims, 14 Drawing Sheets

(56) References Cited

U.S. PATENT DOCUMENTS

| | | | | |
|---|---|---|---|---|
| 2009/0000268 | A1 | 1/2009 | Yurash | |
| 2011/0064179 | A1* | 3/2011 | Birnbach | G21B 1/19 376/191 |
| 2011/0235669 | A1 | 9/2011 | Deri et al. | |
| 2011/0261919 | A1 | 10/2011 | Sefcik et al. | |
| 2013/0064340 | A1 | 3/2013 | Latkowski et al. | |
| 2014/0138359 | A1 | 5/2014 | Carr et al. | |
| 2014/0348283 | A1 | 11/2014 | Perkins et al. | |
| 2018/0211732 | A1 | 7/2018 | Perkins | |

FOREIGN PATENT DOCUMENTS

| | | | | |
|---|---|---|---|---|
| WO | WO-2013055433 | A2 * | 4/2013 | G21B 1/19 |
| WO | 2013070683 | A1 | 5/2013 | |
| WO | 2013133885 | A1 | 9/2013 | |
| WO | 2013165469 | A2 | 11/2013 | |
| WO | 2014113100 | A2 | 7/2014 | |
| WO | 2014130127 | A2 | 8/2014 | |
| WO | 2014160128 | A1 | 10/2014 | |
| WO | 2015021403 | A1 | 2/2015 | |

OTHER PUBLICATIONS

Y. Hosaka et al., "Mode-locked pulse oscillation of a self-resonating enhancement optical cavity" Journal of Physics: Conference Series. 1350. 10.1088/1742-6596/1350/1/012028, 4 pgs., Oct. 2016.

* cited by examiner

Metal cone

SHAPED FUSION TARGET DEVICE AND RELATED PROCESS

BACKGROUND OF INVENTION

The present invention relates generally to fusion energy techniques. In particular, the present invention provides a fusion fuel target and method for generating fusion energy using a high intensity pulse laser generation system, and related methods. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

From the beginning of time, human beings have developed energy sources from natural materials such as wood, coal, oil, and gas products. Unfortunately, burning wood and coal leads to major pollution issues, including adding undesirable carbon particles into the atmosphere. Oil and gas products also have similar limitations and have been a leading cause of "Global Warming." Renewable energy sources including nuclear, wind, hydroelectric, and solar are promising. However, such renewable energy sources have other shortcomings. Wind only works if the wind is blowing. Solar cannot be used when the sun goes down. Hydroelectric is limited to areas with water, and nuclear, although promising, has had major problems in generating waste and unreliable and dangerous reactors. One other promising energy source has been fusion energy.

Fusion energy is a type of energy production that occurs when two atomic nuclei fuse together, releasing a large amount of energy in the process. It is considered a potential source of clean and abundant energy, as the fuel for fusion reactions (mainly hydrogen) is abundant on Earth and the reactions produce no greenhouse gases or other harmful pollutants.

There are two main approaches to achieving fusion reactions: inertial confinement fusion (ICF) and magnetic confinement fusion (MCF).

Inertial confinement fusion (ICF) involves using high-energy lasers or particle beams to compress and heat a small pellet of hydrogen fuel, causing it to fuse. The fuel is typically a mixture of deuterium (D) and tritium (T), two isotopes of hydrogen. The fuel is contained within a small, spherical capsule called a hohlraum, which is placed at the center of a chamber filled with high-energy lasers or particle beams. When the lasers or particle beams are fired at the hohlraum, they create a uniform layer of x-rays that uniformly heat and compress the fuel inside the hohlraum. This causes the fuel to reach the necessary temperature and pressure conditions for fusion to occur.

The main advantage of ICF is that it can potentially produce fusion reactions with a relatively small amount of fuel and at a relatively low cost. However, the process is still in the experimental stage and there are significant technical challenges to before it can be considered a practical source of energy.

Magnetic confinement fusion (MCF) involves using strong magnetic fields to contain and heat a plasma (a hot, ionized gas) of hydrogen fuel, causing it to fuse. The most common type of MCF is called tokamak fusion, which uses a toroidal (doughnut-shaped) chamber to contain the plasma. The plasma is held in the center of the chamber by strong magnetic fields, which are created by running current through a set of coil windings around the chamber. The plasma is heated by injecting energy into it, either through particle beams or through electromagnetic waves.

The main advantage of MCF is that it has the potential to produce fusion reactions on a larger scale, making it more suitable for generating electricity. However, it is a more complex and costly process than ICF and there are still significant technical challenges to overcome before it can be considered a practical source of energy.

Both ICF and MCF have made significant progress in recent years and there are several experimental facilities around the world working on these technologies. However, achieving sustained fusion reactions with net energy production (meaning the energy produced by the fusion reactions is greater than the energy required to initiate and sustain the reactions) remains a major technical challenge.

There are also other approaches to fusion energy being explored, such as magnetized target fusion and muon-catalyzed fusion. However, these approaches are still in the early stages of development. It is not yet clear if fusion energy will be viable as a source of energy.

From the above, fusion energy has the potential to be a clean and abundant source of energy, but significant technical challenges must be overcome before it can be considered a practical source of energy.

SUMMARY OF INVENTION

According to the present invention, techniques related generally to fusion energy are provided. In particular, the present invention provides a fusion fuel target and method for generation of fusion energy using a high intensity pulse laser generation system, and related methods. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

In an example, the present invention provides a nuclear fusion target device. The device has a plurality of fuel target materials, a shaped outer fuel target layer comprising pB11, and a coating overlying the shaped outer fuel target layer.

In an example, the invention provides methods to fabricate pellet targets that are used for nuclear fusion. The main steps of creating a target comprises of molding target materials into shaped structure and followed by coating the shaped target material with ablation or carbon-based materials. The invention describes methods that convert powder chemicals into crystalline or shaped target structure and coat the target structure with ablation materials. The powder chemicals, which are solid at room temperature, contain elements that can result in nuclear fusion reaction, such as boron-11 and hydrogen or lithium-6, deuterium and tritium and they include borane ($B_xH_y$) as $pB^{11}$, lithium hydride (LiH), and lithium deuteride (LiD). The molding methods of the powder chemical utilize physical processes, such as crystallization or applying pressure, to shape the chemical into desired shape with specific crystal quality and morphology. After the shaping process, the physical appearance and the crystal orientation of the chemical can be altered from its initial or received form, but the chemical properties remain the same. The coating methods can utilize conventional semiconductor fabrication techniques, such as physical vapor depositions, dip coating, and other ways of mechanical encapsulation. The coating process offers benefits in mechanical support, isolation from ambient, and enhancement in ablation. The processes described in this invention provide a straightforward fabrication flow to manufacture cost-effective targets for nuclear fusion.

In an alternative example, the present invention provides a method of fabricating a nuclear fusion target device. The method includes providing a mechanical mold device (e.g., mold assembly). The device has a recessed region configured as a shape for a fusion target device in an example. The method includes coating an interior of the recessed region with a coating material, e.g., conformal to the shape of the fusion target. The method includes depositing successively a plurality of fuel target materials overlying the coating material such that the plurality of fuel target materials are configured in the shape of the fusion target and such that a shaped outer fuel target material comprising $pB^{11}$. In an example, the method includes causing formation of the fusion target device in the recessed region and releasing the fusion target device from the recessed region.

Depending upon the example, the present invention can achieve one or more of these benefits and/or advantages. In an example, the present invention provides a fusion energy system including a high intensity pulse or CW laser system configured with a reactor in a compact and spatially efficient system and related methods. In an example, the high intensity pulse or CW laser system provides enough energy to ignite and sustain fusion energy within the reactor. In an example, the present invention offers advantages of generating fusion power through an efficient size, weight, and cost using the present high intensity lasers. In an example, the present system and method is configured to reduce or eliminate parametric instabilities. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF SPECIFIC EXAMPLES

According to the present invention, techniques related generally to fusion energy are provided. In particular, the present invention provides a fusion fuel target and method for generating fusion energy using a high intensity pulse laser generation system, and related methods. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

In an example, a general concept of the invention is to mold solid chemicals into shaped target structure and then coat the target with an ablation material. A processes for shaping target material into desired target shape and geometry are described throughout the present specification and more particularly as follows. In an example, two ways to shape the solid chemicals into the desired target geometry are provided. A first method relates to a crystallization process and a second method relies on the use of physical molding.

Figure 1A:
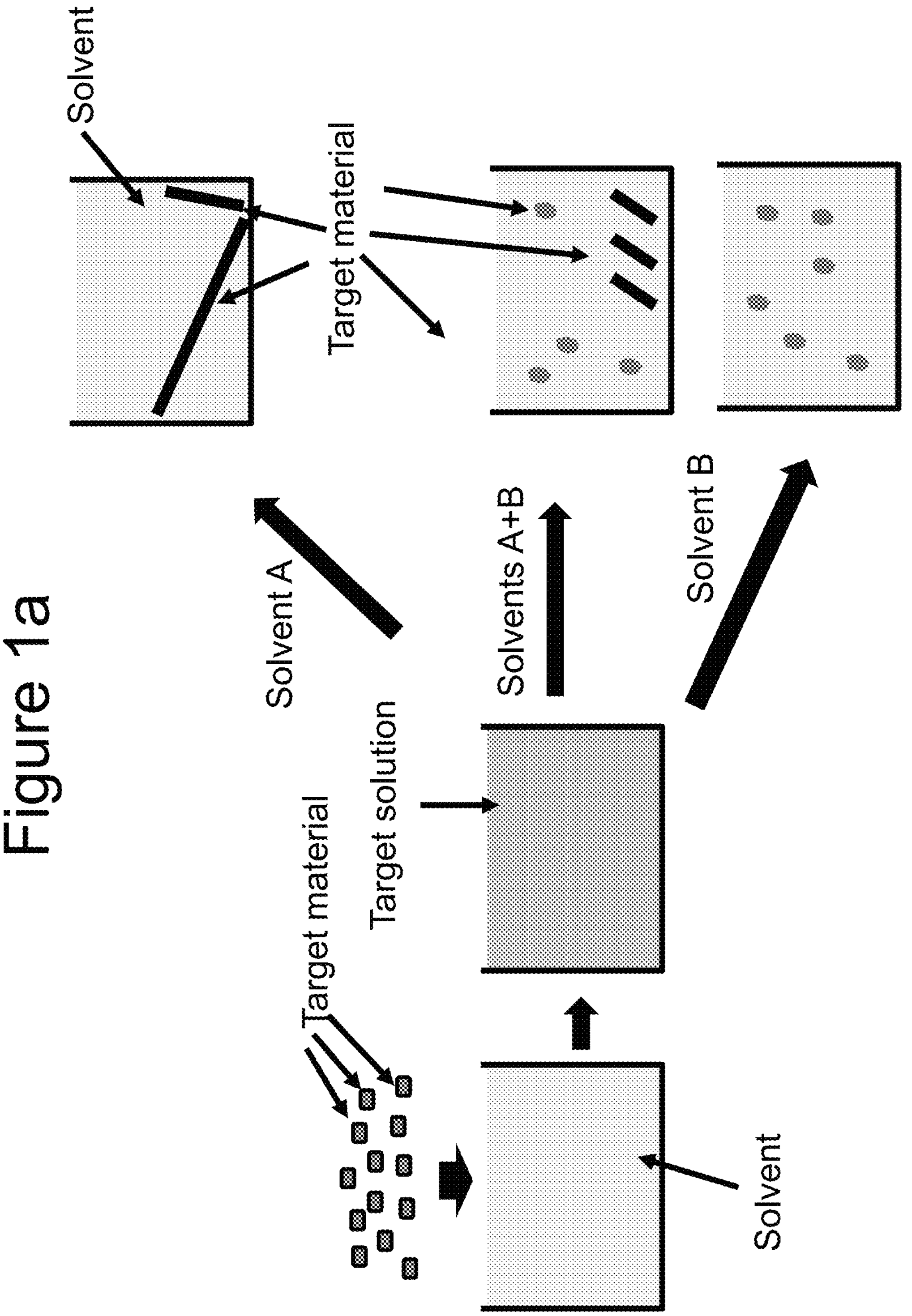
FIG. 1*a* shows a simplified schematic to show the process of crystallization to get target microstructures using different solvent systems according to an example of the present invention.
Figure 1B:
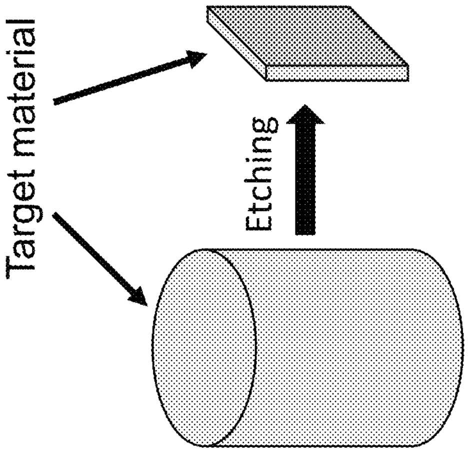
FIG. 1*b* shows a simplified schematic to show the change in the shape and dimensions of target material using etching method according to an example of the present invention.

In the first method, a solvent can be used to dissolve the target material. The solvent described here can be from one solvent or a mixture of more than one solvent. Moreover, the polarity of the solvent can be tuned by adjusting the fractions of the solvents. For example, hexane and tetrahydrofuran (THF) can be employed as the solvent system. Hexane is a nonpolar solvent and THF is a polar solvent. Each solvent has a different solubility to the target material, such as boranes, and has impacts on the crystallization characteristic of the resulting target formation. Because of the difference in solubility of solvents, the crystallization of the target material gives different microstructures of the target properties, including target shape and dimensions. In an example, FIG. 1 (*a*) shows the schematic to show the process of crystallization to get target microstructures using different solvent systems. The geometry and dimensions of the targets depend on the crystallization parameters, such as temperature and time, and the employed solvent system without the use of a physical mold. This method is suitable for target materials that can be crystallized, and the crystallized solid can be formed as the core of the target or can be coated as a layer of the target. For the crystallized solid, additional shaping processes, such as physical or chemical etching, can be applied to alter the final shape as shown in FIG. 1 (*b*).

Figure 2:
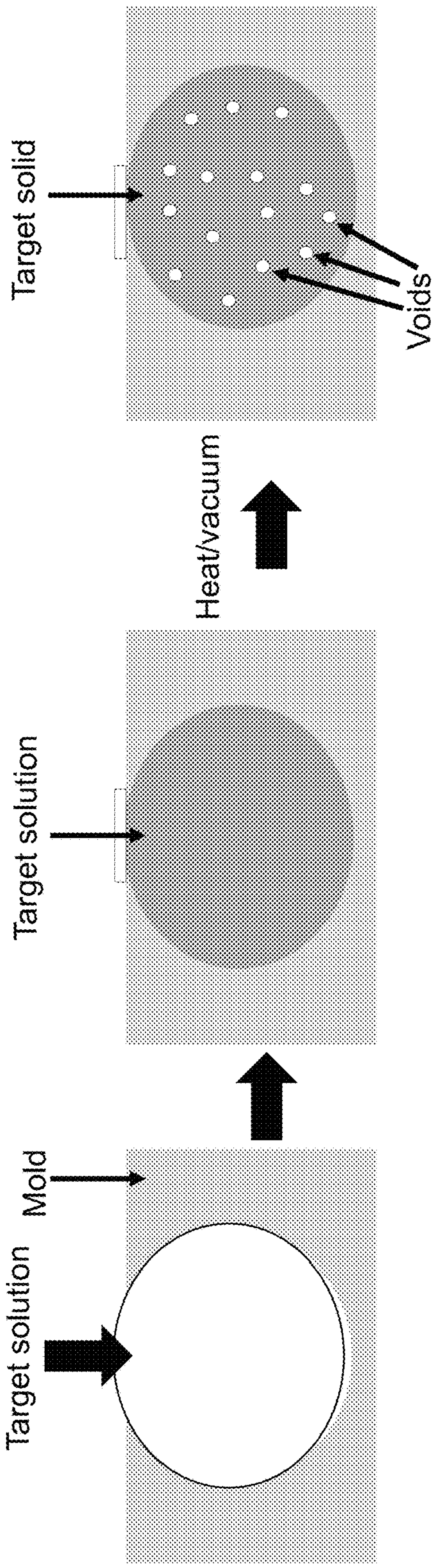
FIG. 2 is a simplified illustration of evaporation of solvent and formation of voids within a target and density of voids according to an example of the present invention.

Alternatively, the second method describes the use of molds to shape the target materials. One way to utilize the mold is to dissolve the target chemical with solvent to form a solution. The solution is then transferred to a mold, where the mold defines the target geometry. After the solution is in the mold, heat and/or vacuum can be applied to the system to remove the solvent from the mold. During the evaporation of solvent, voids are formed within the target and the density of voids depends on the evaporation conditions, as shown in FIG. 2. The surface of the mold can be coated with other materials, such as polymers, that avoids adhesion of target material to the mold and reduces the surface roughness of the target.

Figure 3:
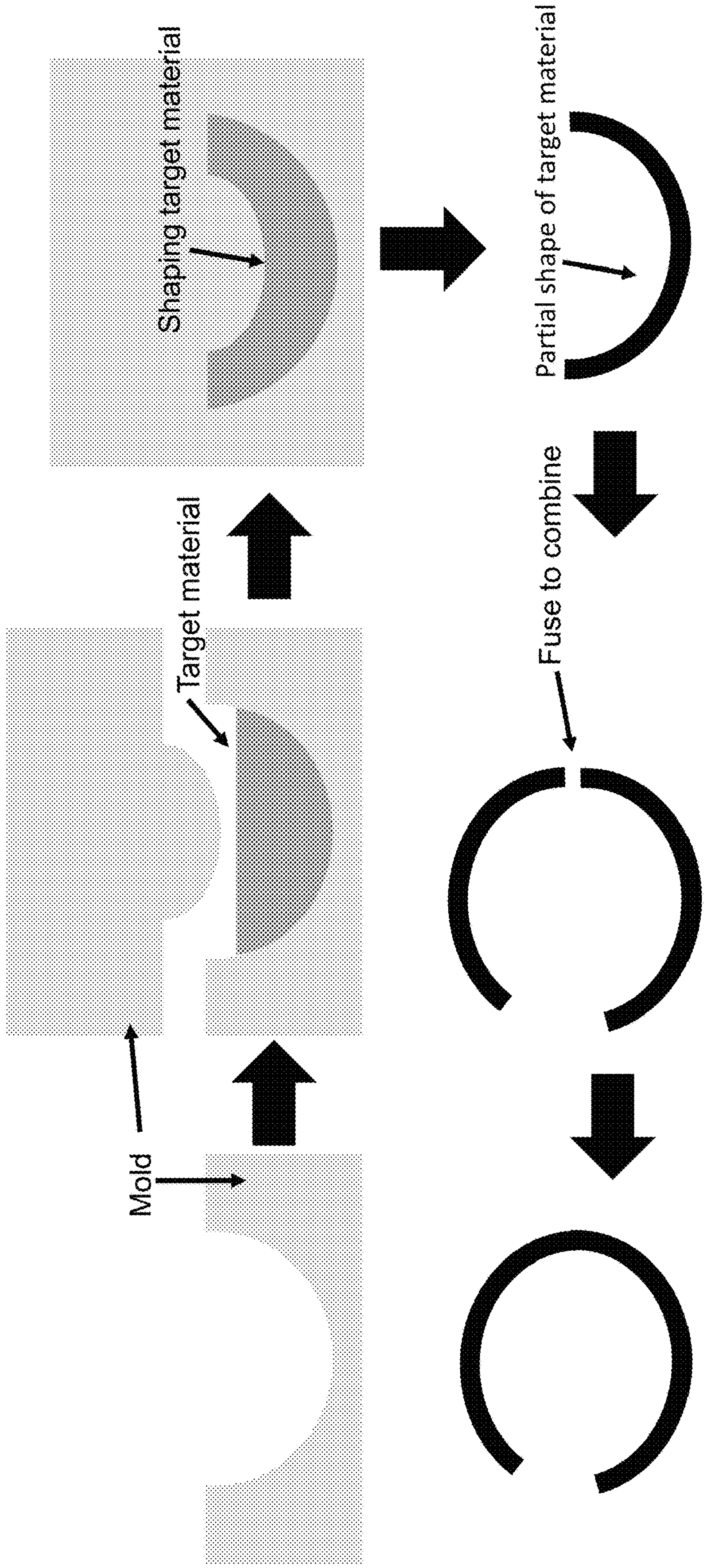
FIG. 3 is a simplified illustration of a method to create a hollow-shaped spherical target according to an example of the present invention.

Other than molding the whole target material, parts of the target can be made from the molds and then combining the parts together to form the desired target geometry. This method creates a hollow-shaped spherical target, as shown in FIG. 3. Different parts of the target are combined using target or other materials as a glue or other approaches to fuse the components together.

Figure 4:
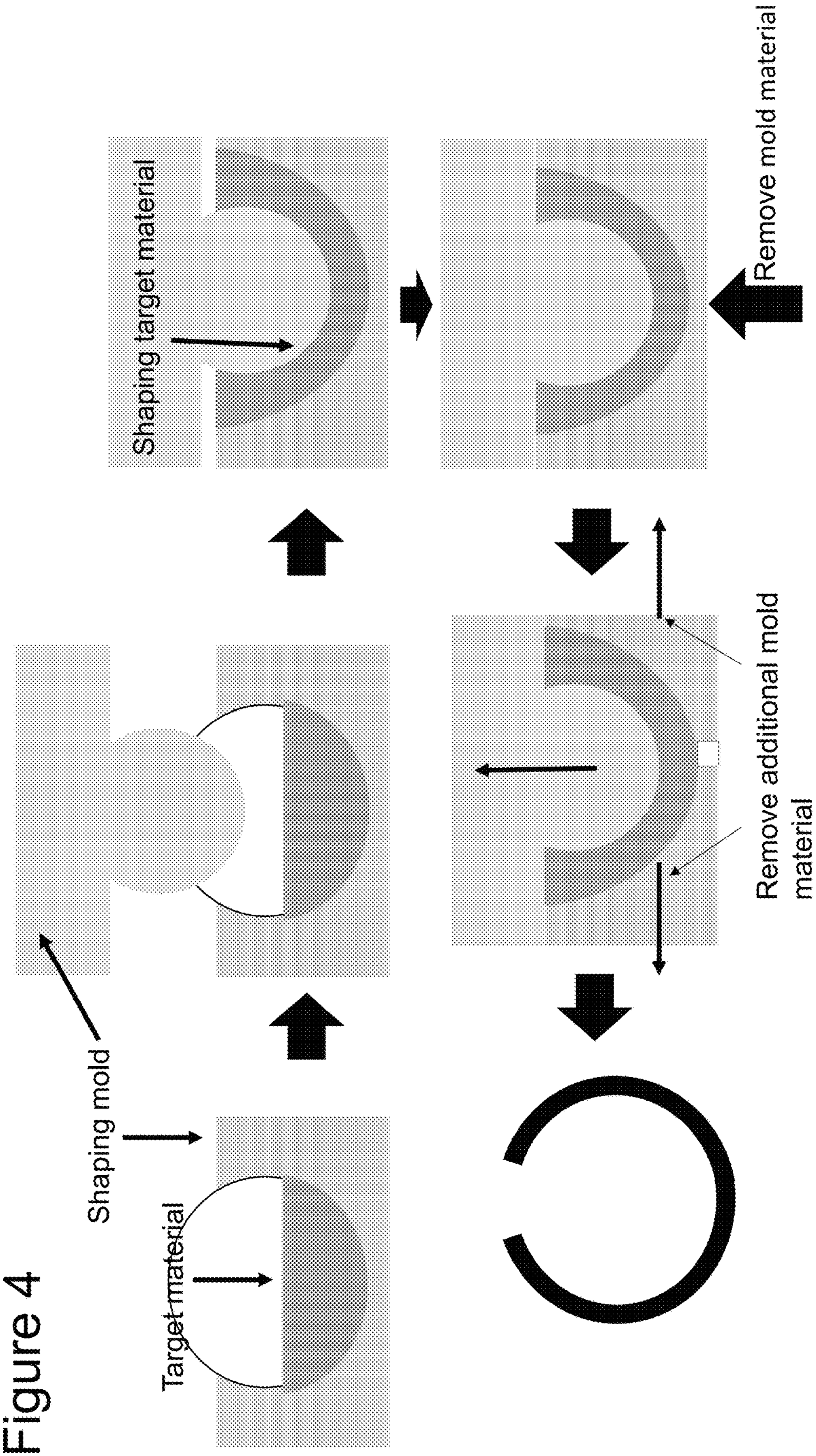
FIG. 4 is a simplified illustration showing employment of molds that are for a single use, while preserving a shape of a target according to an example of the present invention.

To maintain a symmetric spherical or oval target shape, a drawback is that the molded target is difficult to remove from the mold, as shown in FIG. 3, and different target components are needed to be made to overcome this difficulty. Conventionally, molds that are employed to shape the targets are composed of metals and the molds can be used multiple times for the same molding process, where the molds are indestructible. One alternative as shown in FIG. 4 is to employ molds that are used for a single time or use, where preserving the shape of the target is more important, and the molds will be etched and destroyed by the end of the molding process. To achieve a cost-effective process, the materials for this new type of molds should be scalable and cost effective, for example silicon or silicon dioxide, while offering excellent chemical properties to remain inert to the target material and providing straightforward approaches to remove the molds after the shaping process. After shaping the target material with either mechanical forces or heat, mature etching techniques can be applied and selectively remove the mold materials without damaging the target material or degrading the target shape.

Figure 5:
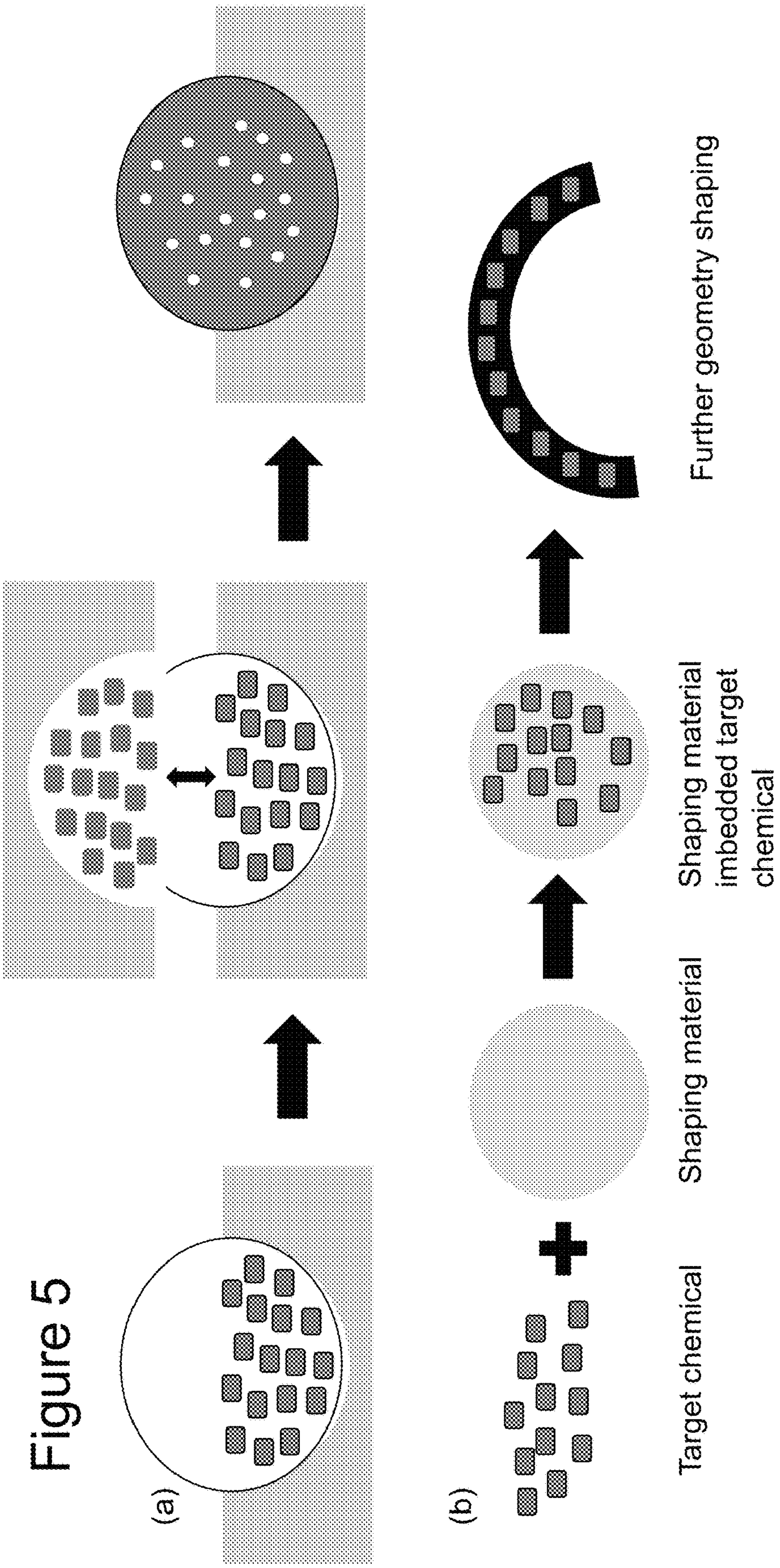
FIG. 5 is a simplified illustration of target materials placed in a half mold and pressure applied when the half molds combine according to an example of the present invention and is a simplified illustration of shaping a material performed after incorporating the target material according to an example of the present invention.

On the other hand, the target chemical can go through another process route where dissolving into solvent is not required and maintain a solid form during the shaping process by using mechanical forces. The target materials are placed in a half mold and pressure can be applied when the half molds combine, as shown in FIG. 5, See reference letter "a". To provide additional mechanical strength, target material can be added to shaping material, that is chemical inert and offers mechanical support to the target material, to create a uniform target geometry. Some of the shaping material examples are polymers, mineral oil, or paraffin wax, where they offer sufficient mechanical strength and are easy to manipulate while remaining chemical inert to most chemicals. The target material in the shaping material can be uniformly or partially distributed, depending on the overall target design and structure. Further shaping of the shaping material can be performed after incorporating the target material, as shown in FIG. 5, See reference letter "b".

Figure 6A:
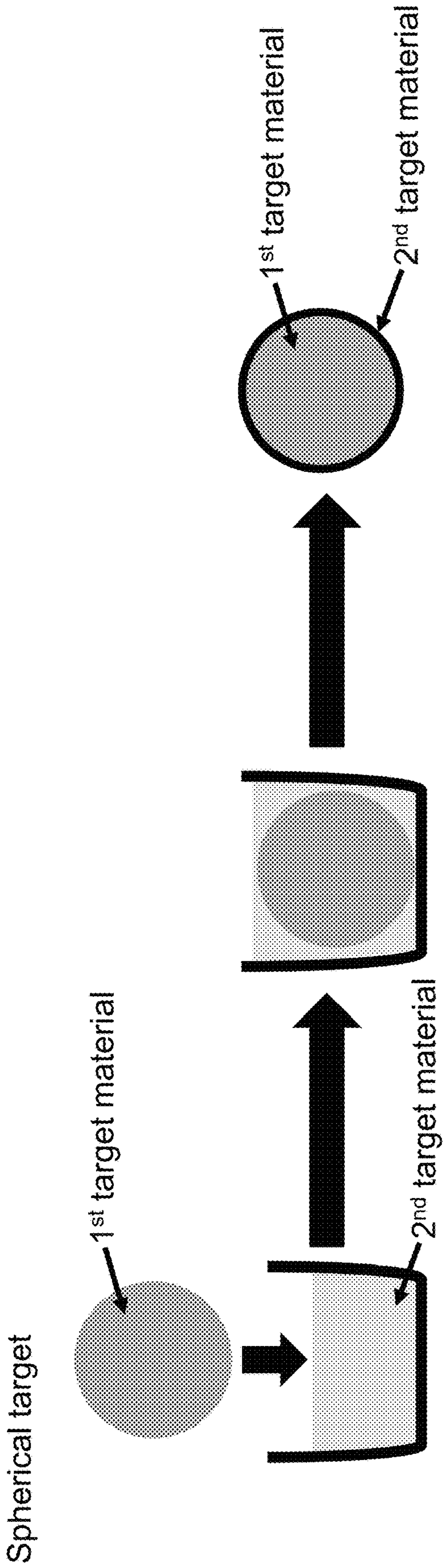
FIG. 6*a* is a simplified illustration that shows schematics of the adding multiple target materials onto a target material for spherical shaped geometry according to an example of the present invention.
Figure 6B:
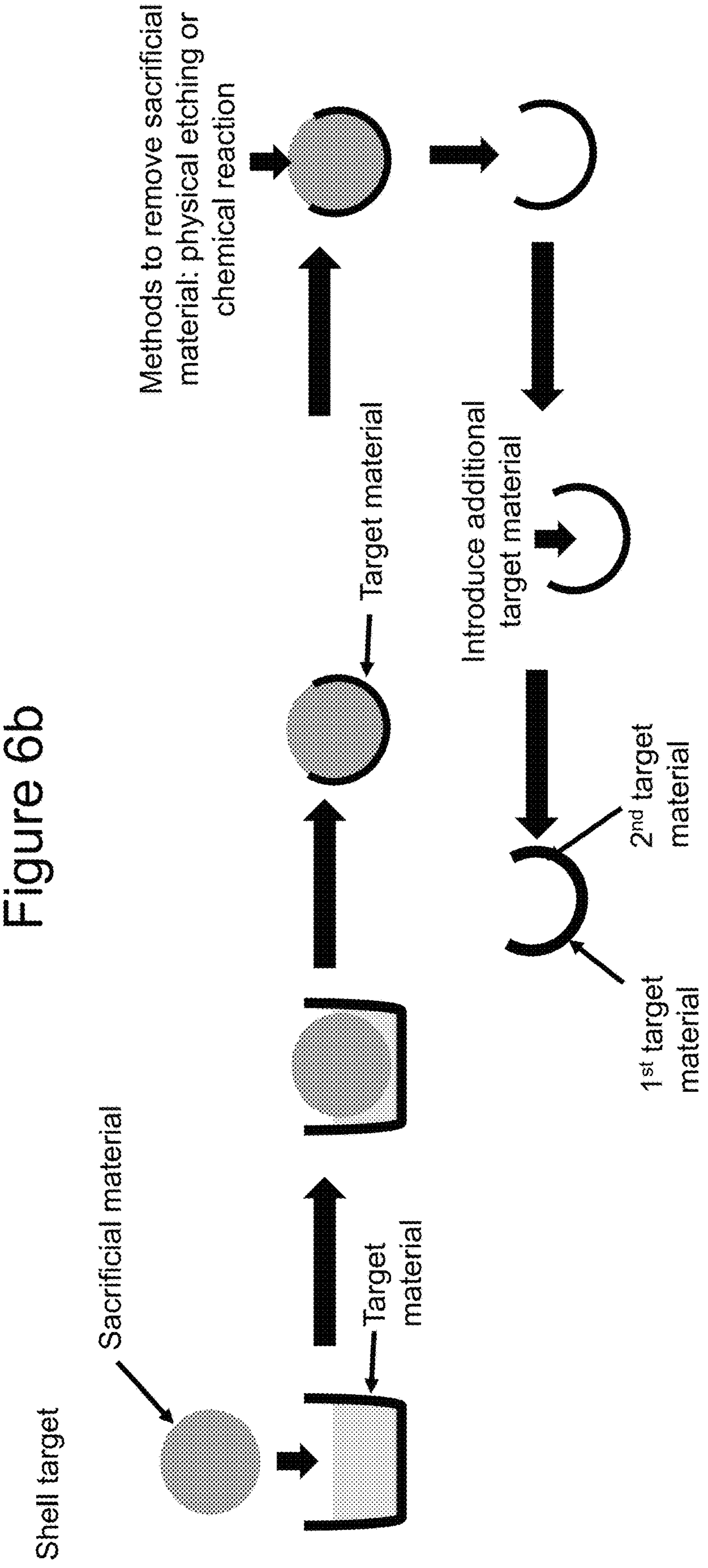
FIG. 6*b* is a simplified illustration that shows schematics of the adding multiple target materials onto a target material for shell shaped geometry according to an example of the present invention.
Figure 7:
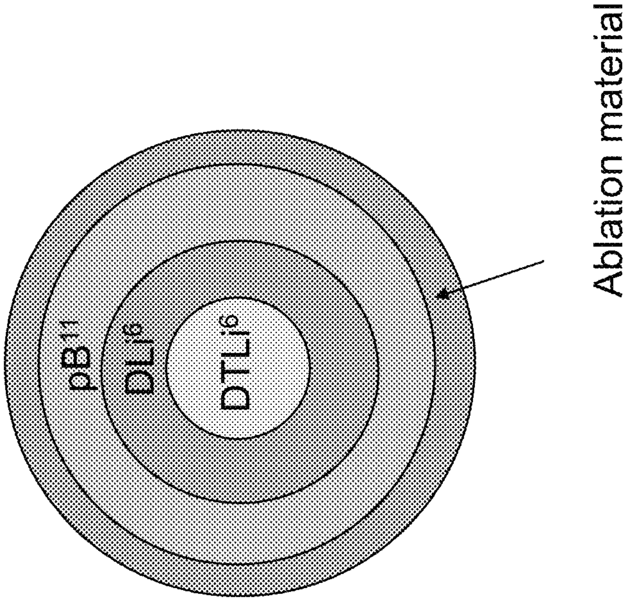
FIG. 7 is a simplified illustration of a final target pellet structure according to an example of the present invention.

The target can incorporate multiple chemicals within its structure. FIG. 6 (a and b) shows the schematics of the adding multiple target materials onto the first target material for either spherical or shell shaped geometry. For spherical target method, it uses the first fuel target material be the desired shape, such as a sphere. Additional layers of fuel target materials can be introduced to the target by coating the new fuel target material onto the target sphere, where the new second fuel target material can be in a solution form or mix with a shaping material. Then, third new fuel material is coated. After each coating, the interruption time of dry or heat treatment for the coated material could be inserted. For examples, the first fuel target material is D(deuterium) or T(tritium) Li(lithium), second fuel target material is $DLi^6$, the third fuel target material is decaborane ($B_{10}H_{14}$) as $p(proton)B(boron)^{11}$ and fourth target material is a laser ablation material, are coated continuously as mentioned above. After each coating, the interruption time of dry or heat treatment for the coated material could be inserted. The DTLi is wherein a part of D of $DLi^6$ is replaced by T. As obtained final target pellet structure is shown in FIG. 7. The target used for a central ignition method of laser nuclear fusion.

On the other hand, the shell target employs a sacrificial material that has the desired target shape. The sacrificial material can be polymers, dielectric materials, or paraffin wax, where it can be removed without damaging the target shape and material. The first fuel target layer is coated partially on the sacrificial material, and the sacrificial material is subsequently removed using physical or chemical processes.

Figure 8:
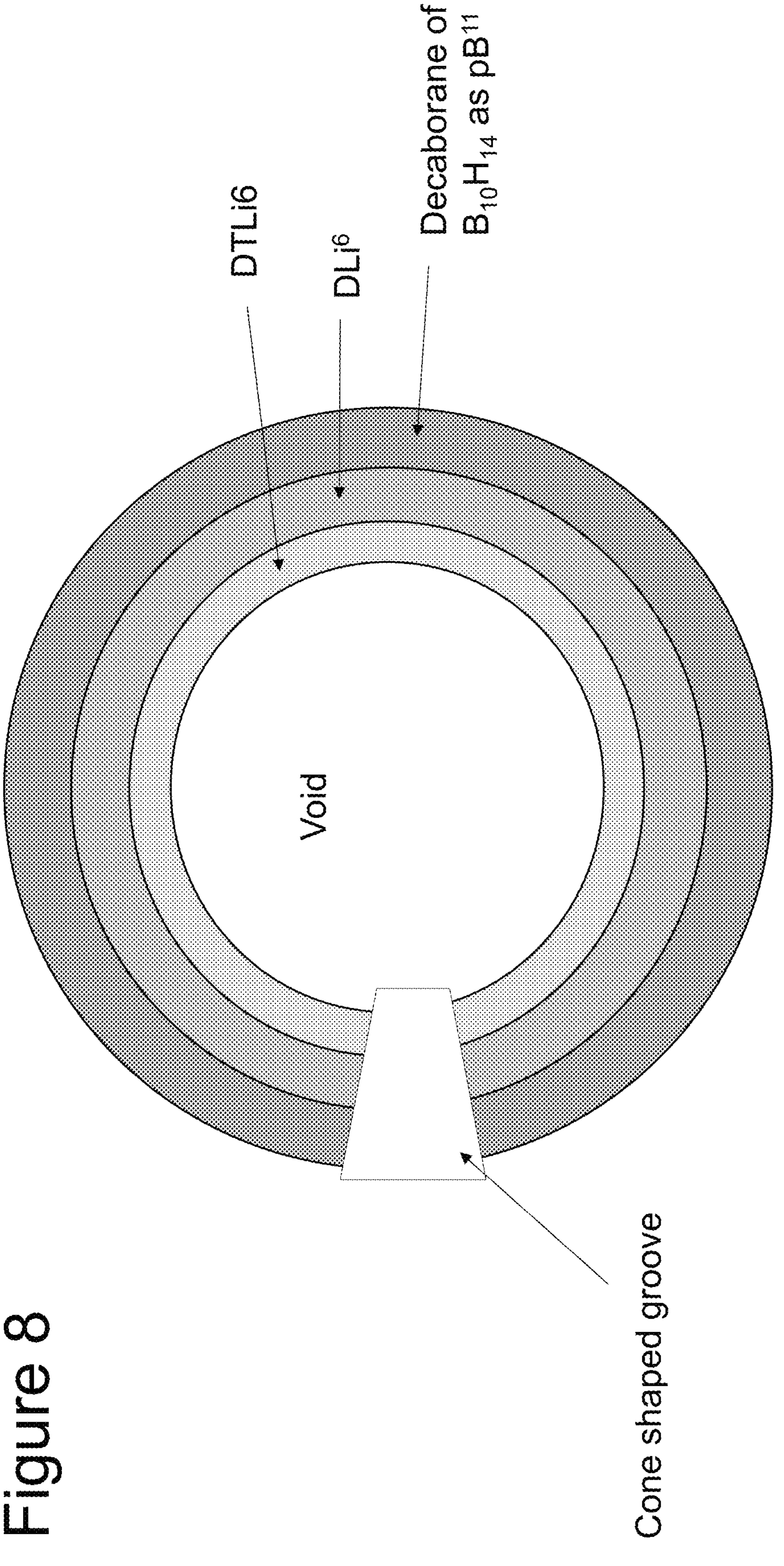
FIG. 8 is a simplified illustration of a final target pellet structure according to an example of the present invention.
Figure 9:
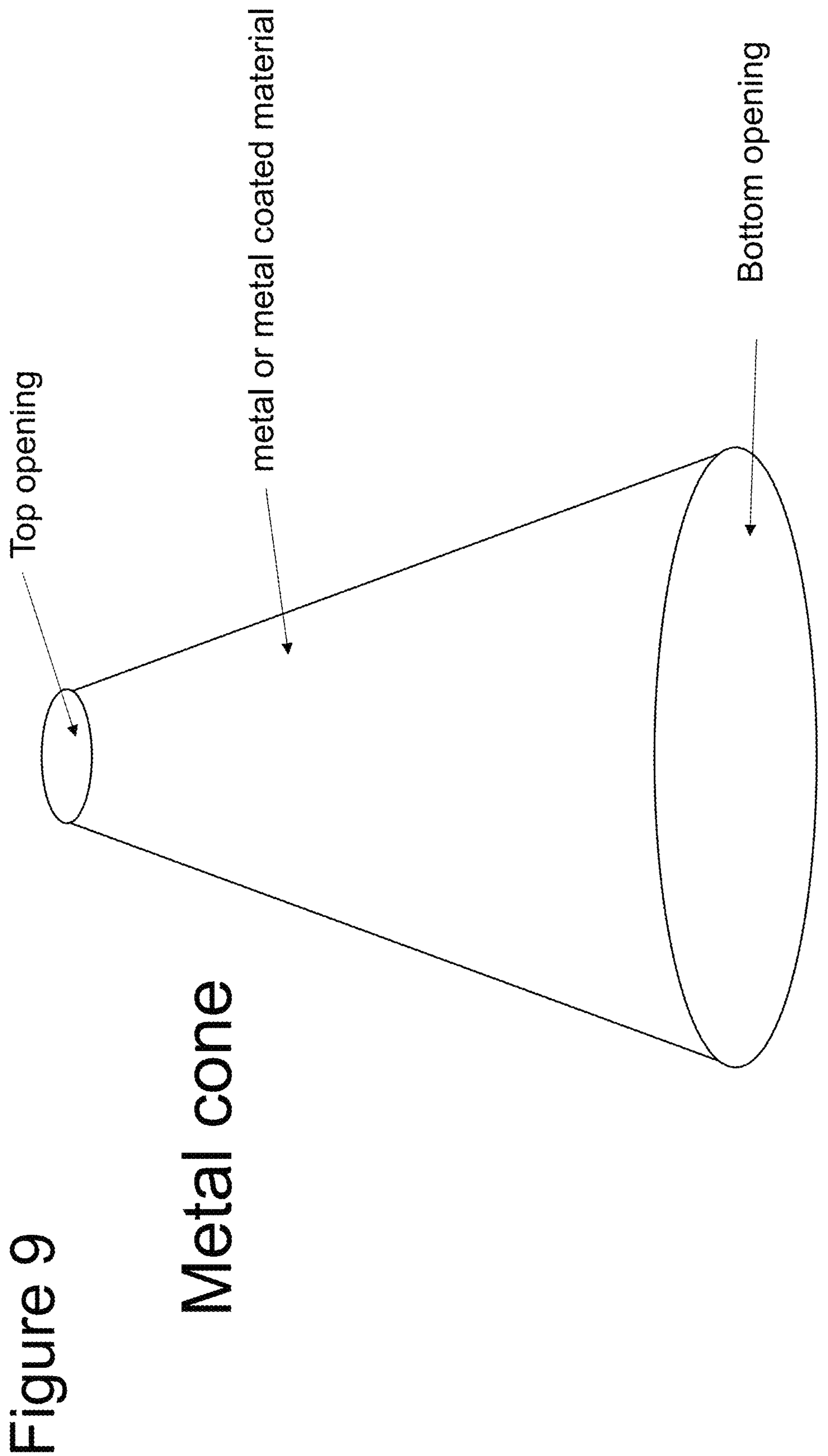
FIG. 9 shows a simplified illustration of a metal cone which has opening at top and bottom of the cone according to an example of the present invention.
Figure 10:
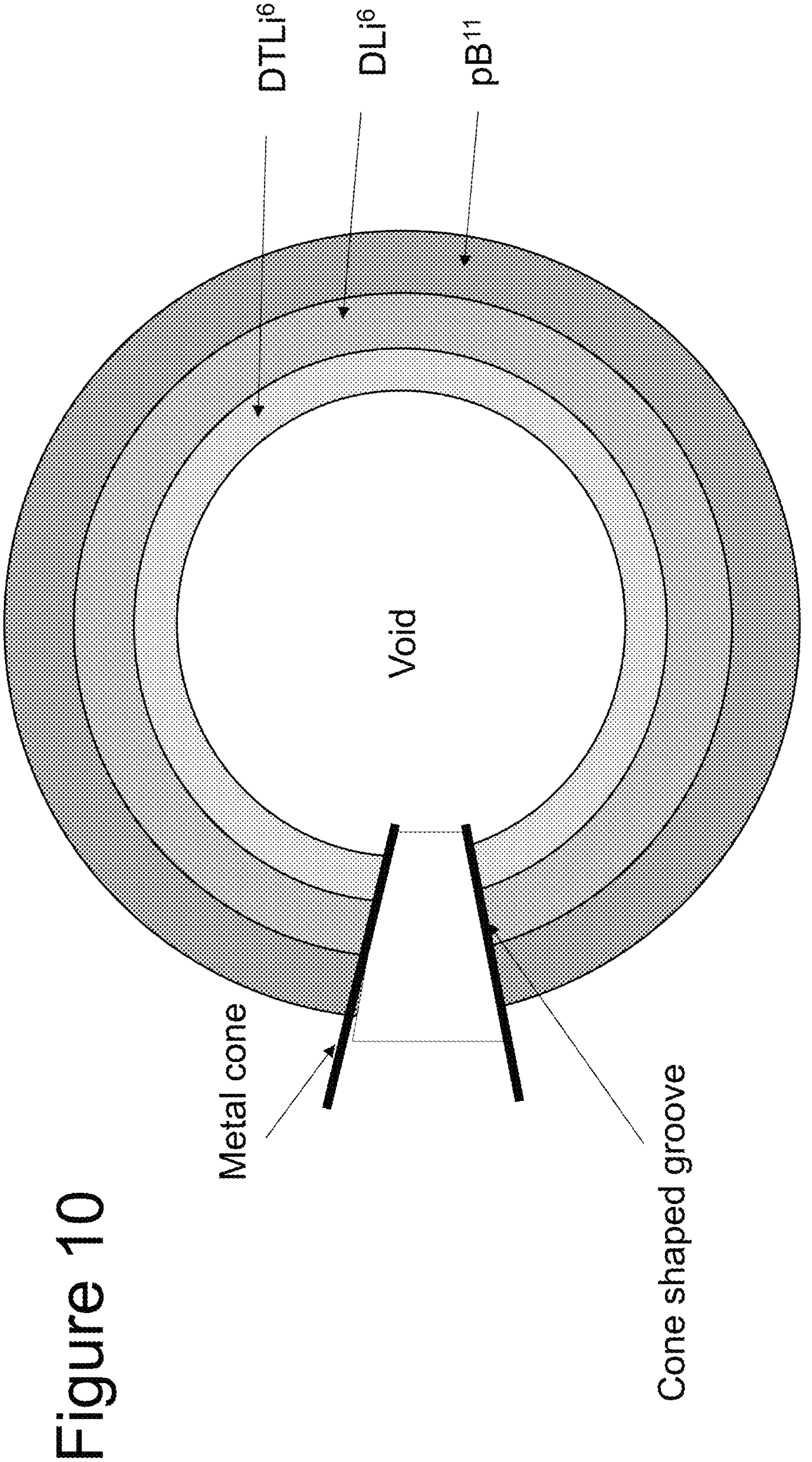
FIG. 10 shows a simplified illustration of a final structure of target pellet where a metal cone is inserted into a cone shaped groove according to an example of the present invention.

For multilayers, after the first fuel layer is coated and then second fuel layer is coated on the first fuel layer, and then third fuel layer is coated on the second fuel layer and then so on. After each coating, the interruption time of dry or heat treatment for the coated material could be inserted. Then, the sacrificial material is subsequently removed using physical or chemical processes. For examples, the first fuel layer is D or T Li, second fuel layer is $DLi^6$ and the third fuel layer is decaborane ($B_{10}H_{14}$) as $pB^{11}$ are coated continuously as mentioned above, and then the sacrificial material is subsequently removed using physical or chemical processes. As obtained final target pellet structure is shown in FIG. 8. FIG. 9 shows a metal cone which has opening at top and bottom of the cone. The side wall of the cone is made by metal or metal coated material. The metal is a high Z metal, such as gold (Au), lead (Pb) and others. FIG. 10 shows the final structure of target pellet where the metal cone of FIG. 9 is inserted into the cone shaped groove of FIG. 8.

In an example, the target of FIG. 10 for an inner irradiation method of laser nuclear fusion is shown. Examples of targets can be found in "TARGET DEVICE WITH A LOW IGNITION TEMPERATURE FOR INERTIAL CONFINEMENT FUSION (ICF)" listed under U.S. patent application Ser. No. 18/482,798 filed Oct. 6, 1923, "INNER RADIATION IGNITION METHOD FOR INERTIAL CONFINEMENT FUSION" listed under U.S. patent application Ser. No. 18/498,902 filed Oct. 31, 1923, "MULTI-LAYERED FUSION FUEL TARGET FOR INERTIAL CONFINEMENT FUSION" filed under U.S. patent application Ser. No. 18/507,900 filed Nov. 13, 1923, and "SOLID TARGET STRUCTURE WITH A LOW IGNITION TEMPERA- TURE," listed under U.S. patent application Ser. No. 18/526,618 filed Dec. 1, 2023, each of which is commonly assigned and hereby incorporated by reference herein in its entirety for all purposes.

For multilayer target, another method is after the first fuel layer is coated, second fuel target material is added, and then third fuel target material is added continuously inside the first layer via the opening of the layer. In this case, the first target material is decaborane ($B_{10}H_{14}$) as $pB^{11}$, second target material is $DLi^6$, third one is TLi. Shaping material can be used as a curing agent. Although the processes described here employ spherical or shell targets, the geometry of the target is not the key factor. The additional material in the spherical target route is added material away from the center of the sphere, while the additional target material is added towards the center of the hollow sphere in the shell target process, hence the processes for fabricating multiple layers of target materials are not specific to a certain target shape and geometry.

Figure 11:
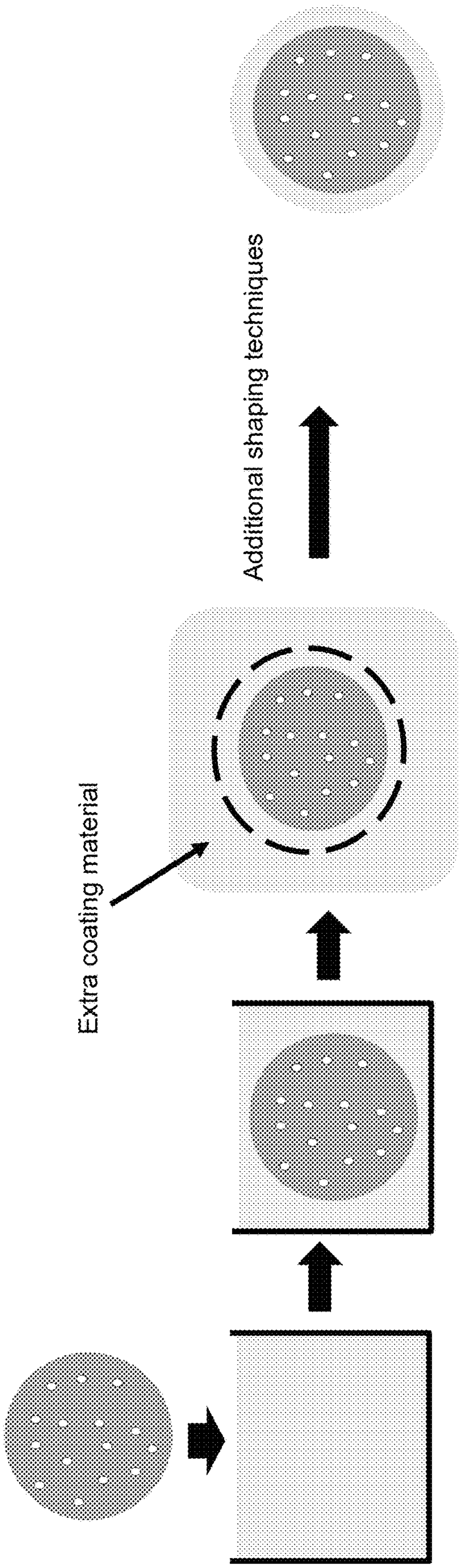
FIG. 11 is a simplified illustration of depositing carbon-based materials, dip coating and additional techniques such as molding, polishing, or etching according to an example of the present invention.

For the coating process, multiple layers of coating materials are necessary for target coating to reduce the ignition temperature, to increase the target gain or to reduce a number of neutron generations. Several traditional physical deposition techniques for thin films can be used for target coating, such as dip coating, spin coating, sputtering, thermal evaporation, and electron-beam evaporation, with different desired materials. Each layer can be composed of metals or carbon-based materials, such as diamond, paraffin wax, and polymers. The functions of the coating materials include reducing laser-plasma instabilities, isolation barrier, and mechanical support. For film thickness beyond 10 μm or depositing carbon-based materials, dip coating can be beneficial, as shown in FIG. 11. The rough shape of the carbon-based coating is defined by either the target geometry or the mold, while the surface roughness and detailed geometry can be modified by additional techniques like molding, polishing, or etching, as shown in FIG. 11.

Figure 12:
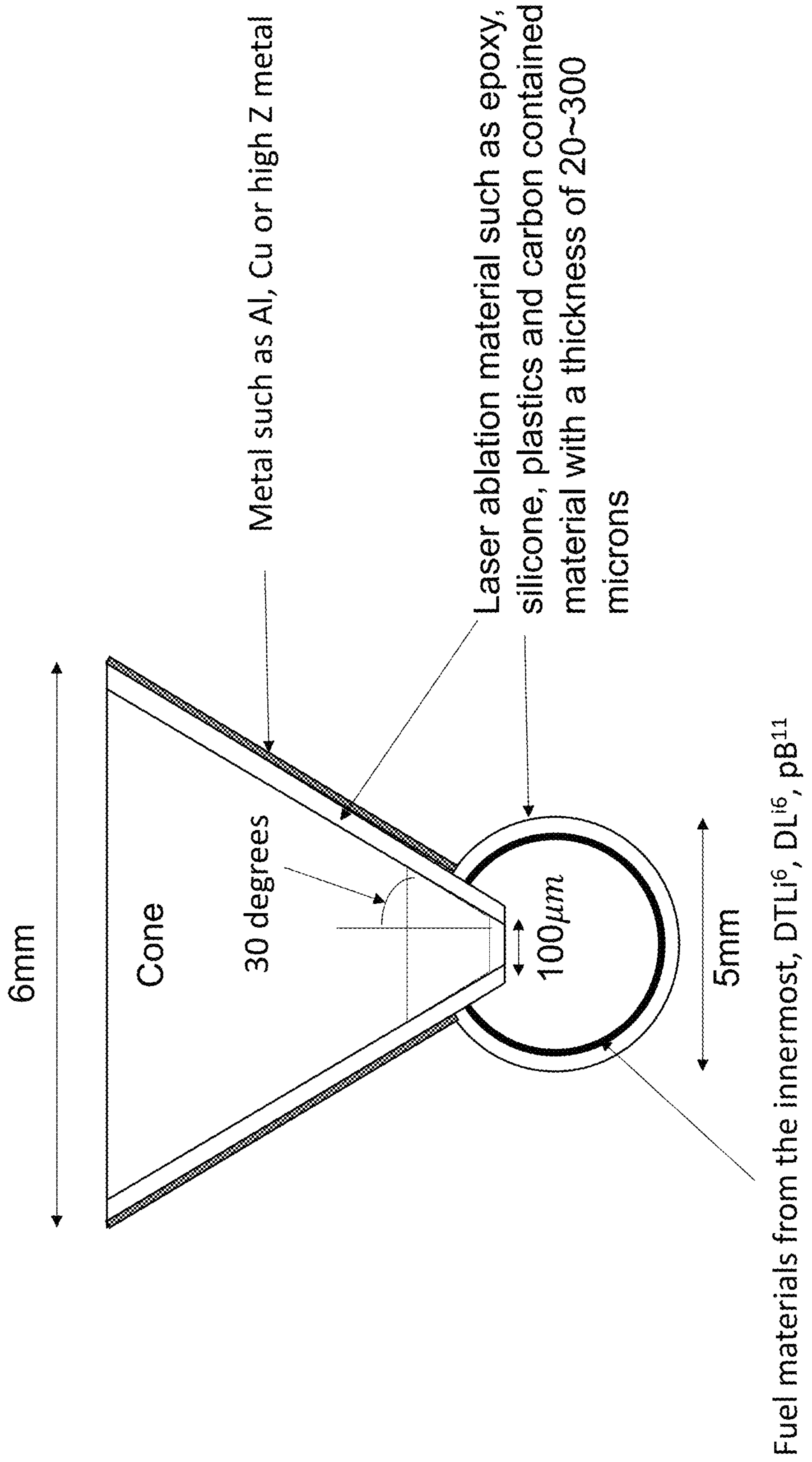
FIG. 12 shows a simplified illustration of a final structure of target where a spherical ablator and a cone-shaped one are made from epoxy material according to an example of the present invention.

Another example of the present invention of how to make the sphere target configured with a metal cone is shown in FIG. 12.

A spherical ablator and a cone-shaped is one piece, and made from an epoxy material with a thickness, e.g., of 20~300 microns, in one piece. In an example, a laser ablator material is such as epoxy, silicone, plastics and carbon contained material.

Metal with a thickness, e.g., of 0.1~100 microns, is deposited outside of the cone. Metal is can be material such as Al, Cu or high Z metal, among others. Metal prevents the plasma from cone region for a heating laser to enter into the center void through the cone.

Using a dispenser, pour a certain amount of slurry made from liquid fuel powder into the mouth of the cone.

Rotate with a high speed to spread the slurry uniformly with a certain thickness on the inside of the sphere shaped ablator.

Dry the spherical ablator and a cone-shaped one at a high temperature of 30~100 C for the slurry to become a solid.

Then, second fuel slurry is poured using the dispenser. Other process is repeated from 3) to 5) until a final fuel is deposited. A targert shown in FIG. 10, for example, is made using this technique. At first $pB^{11}$ of decaborane, $B_{10}H_{14}$, is coated. Second fuel of $DLi^6$ is coated next. Third fuel of $DTLi^6$ is coated. In this invention, the spherical ablator and a cone-shaped one is made in one piece with a same material of epoxy. Thus, the cost is lower and a strength is desirable even at a high speed acceleration by target injector with a speed of 10 km/sec, for example. Also, the fuel materials are coated inside of the sphere shaped ablator. Thus, the fuel materials are not collapased during the high acceleration by the target injector with a speed of up to 10 km/sec.

In an example, the present invention provides a method of fabricating a nuclear fusion target device. The method includes providing a mechanical mold device (e.g., mold assembly). The device has a recessed region configured as a shape for a fusion target device in an example. The method includes coating an interior of the recessed region with a coating material, e.g., conformal to the shape of the fusion target. The method includes depositing successively a plurality of fuel target materials overlying the coating material such that the plurality of fuel target materials are configured in the shape of the fusion target and such that a shaped outer fuel target material comprising $pB^{11}$. In an example, the method includes causing formation of the fusion target device in the recessed region and releasing the fusion target device from the recessed region.

In an example, the released fusion target is free from the mold device.

In an example, each of the fuel target materials is characterized as solid at room temperature. In an example, at least one of the fuel target materials comprises at least a deuterium, a tritium, a boron, or a lithium. In an example, the fusion target device is characterized by a size of less than 10 mm in diameter but can be other sizes. In an example, the fuel target materials comprises a void at a center of the device. That is, the void is an inner region which causes the fuel target to be hollow.

In an example, the coating comprises an ablation material, the ablation material comprising a plurality of metals or a plurality of carbon-containing materials including at least one of an epoxy, a silicone, or a plastic. Preferably, the coating is provided first, rather than last in sequence.

In an example, the plurality of fuel target materials comprising the coating.

In an example, the shaped outer fuel target layer is provided by crystallization. In an example, the crystallization comprises one or more solvents that are subsequently removed using heat or vacuum. In an example, the mechanical mold device comprises a metal, a dielectric material, or a semiconductor material.

In an example, the shaped outer fuel target layer is provided by applying pressure or mechanical forces in the mechanical mold device.

In an example, the $pB^{11}$ is selected from at least one of a borane ($B_xH_y$), including a decaborane ($B_{10}H_{14}$) or a hydrogen boride (HB), or a deuterium or tritium derivatives ($B_xD_yH_z$ or $B_xD_yT_wH_z$), where x is equal to or less than the sum of w+y+z.

In an example, at least one of the fuel target materials is at least one of a lithium hydride (LiH), a deuterium or tritium derivatives ($Dli^6$ or $Tli^6$) or a $DTLi^6$, among others.

In an example, the plurality of fuel target materials comprises multiple layers of deuterium, tritium, boron, or lithium containing entities.

In an example, the fuel target material can be provided by mixing one or more of the target material with shaping materials including at least one of polymers, a mineral oil, or a wax.

In an example, one or more of the fuel target materials are configured using a physical or chemical etching.

In an example, the void is characterized by a size provided by a shaping process.

In an example, the carbon containing material comprises a polymer, a wax, or a diamond.

In an example, the coating is provided by a dip coating.

In an example, the coating is subjected to a removing process selected from one of etching or polishing to remove excessive coating material to achieve a desired target shape.

In an example, the fuel target device is characterized by a purity, a geometry, and a dimension.

In an example, the fusion target device comprises a sphere shape and a cone shape comprising coating one or more materials in one piece. In an example, at least one of the materials is an ablator material including at least one of an epoxy, a silicone, or a plastic. In an example, the coating has a thickness, e.g., of 20~300 microns. In an example, the cone shape comprises a metal configured outside of the cone shape. In an example, the metal is characterized by a thickness of 0.1~100 microns, among others. In an example, the shaped outer fuel target material comprising $pB^{11}$ including $B_{10}H^{14}$ is deposited before other fuel target materials.

In an example, further details of an optical enhancement cavity using the Fabry Perot cavity is found in a patent application titled "A FAST IGNITION FUSION SYSTEM AND METHOD," in the names of Shuji Nakamura and Hiroaki Ohta listed under U.S. Ser. No. 18/319,368 filed May 17, 1923, commonly assigned, and hereby incorporated by reference in their entirety.

While the above is a full description of the specific examples, various modifications, alternative constructions and equivalents may be used. As an example, the device can include any combination of elements described above, as well as outside of the present specification. Additionally, the terms first, second, third. And final do not imply order in one or more of the present examples. Therefore, the above description and illustrations should not be taken as limiting the scope of the present invention which is defined by the appended claims.

The invention claimed is:

1. A method of fabricating a nuclear fusion target device, the method comprising:

providing a mechanical mold device having a recessed region configured as a shape for the nuclear fusion target device;

coating an interior of the recessed region with a coating material, thereby forming an exterior shell of the nuclear fusion target device;

while the shell is within the recessed region of the mechanical mold device, successively depositing a plurality of fuel target layers on an inner surface of the exterior shell such that each of the plurality of fuel target materials are configured in the shape of the fuel target device within the shell, wherein the plurality of fuel target layers comprise an outermost fuel target layer comprising a first fuel material comprising $pB^{11}$ and at least two inner target layers comprising additional fuel materials; and releasing the shell containing the plurality of fuel target layers from the recessed region of the mechanical mold device.

2. The method of claim 1 wherein each of the fuel target materials is characterized as solid at room temperature.

3. The method of claim 1 wherein at least one of the fuel target layers comprises at least one of a deuterium compound, a tritium compound, a boron compound, or a lithium compound.

4. The method of claim 1 wherein the fusion target device is characterized by a size of less than 10 mm in diameter.

5. The method of claim 1, wherein the fusion target device further comprises a void at a center of the device surrounded by the plurality of fuel target layers.

6. The method of claim 5, wherein the void has a size defined by a shaping process.

7. The method of claim 1, wherein the coating material comprises an ablation material, and wherein the ablation material comprises at least one of a metal an epoxy, a silicone, or a plastic.

8. The method of claim 7, wherein the ablation material further comprises at least one of a wax or a diamond.

9. The method of claim 7, wherein coating the interior of the recessed region comprises dip coating.

10. The method of claim 7, wherein coating the interior of the recessed region further comprises etching or polishing the coating material to achieve a desired target shape.

11. The method of claim 1 wherein successively depositing the plurality of fuel target layers comprises crystallizing the outermost fuel target layer.

12. The method of claim 11, wherein crystallizing the outermost fuel target layer comprises using one or more solvents that are subsequently removed using heat or vacuum.

13. The method of claim 1 wherein successively depositing the plurality of fuel target layers comprises applying pressure or mechanical forces in the mechanical mold device.

14. The method of claim 13, wherein the mechanical mold device comprises a metal, a dielectric material, or a semiconductor material.

15. The method of claim 1 wherein the $pB^{11}$ is selected from at least one of a borane ($B_xH_y$), including a decaborane ($B_{10}H_{14}$) or a hydrogen boride (HB), or a deuterium or tritium derivatives ($B_xD_yH_z$ or $B_xD_yT_wH_z$), where x is equal to or less than the sum of w+y+z.

16. The method of claim 1 wherein at least one of the fuel target materials comprises at least one of lithium hydride (LiH), $DLi^6$, $TLi^6$ or $DTLi^6$.

17. The method of claim 1 wherein the plurality of fuel target materials comprises multiple layers of deuterium, tritium, boron, or lithium containing entities.

18. The method of claim 1, wherein successively depositing the plurality of fuel target layers comprises mixing at least one fuel target material with a shaping materials including at least one of a polymer, a mineral oil, or a wax.

19. The method of claim 1, wherein successively depositing the plurality of fuel target layers comprises physically or chemically etching at least one of the fuel target layers.

20. The method of claim 1, wherein coating the interior of the recessed region forms the exterior shell comprising a sphere-shaped portion and a cone-shaped portion formed as one piece.

21. The method of claim 20, wherein the exterior shell comprises an ablator material including at least one of an epoxy, a silicone, or a plastic.

22. The method of claim 20, wherein the coating material has a thickness of 20-300 microns.

23. The method of claim 20, further comprising disposing a metal on an exterior of the cone-shaped portion.

24. The method of claim 23, wherein the metal has a thickness of 0.1-100 microns.

25. The method of claim 24, wherein the outermost fuel target layer includes $B_{10}H^{14}$, and wherein the outermost fuel target layer is deposited before the at least two inner target layers.

* * * * *